United States Patent
Gu (10) Patent No.: US 11,736,996 B2
(45) Date of Patent: Aug. 22, 2023

(54) CONDITIONAL HANDOVER METHOD AND APPARATUS

(71) Applicant: SPREADTRUM COMMUNICATIONS (SHANGHAI) CO., LTD., Shanghai (CN)

(72) Inventor: Xiangxin Gu, Shanghai (CN)

(73) Assignee: SPREADTRUM COMMUNICATIONS (SHANGHAI) CO.. LTD., Shanghai (CN)

( * ) Notice: Subject to any disclaimer, the term of this patent is extended or adjusted under 35 U.S.C. 154(b) by 26 days.

(21) Appl. No.: 17/269,103

(22) PCT Filed: Jul. 19, 2019

(86) PCT No.: PCT/CN2019/096773
§ 371 (c)(1),
(2) Date: Feb. 17, 2021

(87) PCT Pub. No.: WO2020/034807
PCT Pub. Date: Feb. 20, 2020

(65) Prior Publication Data
US 2021/0314834 A1 Oct. 7, 2021

(30) Foreign Application Priority Data
Aug. 17, 2018 (CN) .......................... 201810945141.9

(51) Int. Cl.
H04W 36/00 (2009.01)
H04W 76/19 (2018.01)
H04W 28/26 (2009.01)

(52) U.S. Cl.
CPC ..... *H04W 36/00837* (2018.08); *H04W 28/26* (2013.01); *H04W 36/0016* (2013.01); *H04W 36/0058* (2018.08); *H04W 76/19* (2018.02)

(58) Field of Classification Search
None
See application file for complete search history.

(56) References Cited

U.S. PATENT DOCUMENTS 10,455,456 B2 * 10/2019 Jang ................. H04W 28/0268
11,272,412 B2 * 3/2022 Damnjanovic ....... H04W 36/10
(Continued)

FOREIGN PATENT DOCUMENTS

| CN | 101431772 A | 5/2009 |
| CN | 101505514 A | 8/2009 |

(Continued)

OTHER PUBLICATIONS

CNIPA The First Office Action for corresponding CN Application No. 201810945141.9; dated Apr. 27, 2021.
(Continued)

*Primary Examiner* — Kenny S Lin
(74) *Attorney, Agent, or Firm* — Cantor Colburn LLP (57) ABSTRACT

A conditional handover method and apparatus are provided. The method may include: transmitting a measurement report to a source base station, receiving a conditional handover command from the source base station; and when a connection failure occurs, performing a handover procedure in a target cell or a Radio Resource Control (RRC) re-establishment procedure, wherein the conditional handover command comprises a first signal condition, and the first signal condition comprises signal quality of a neighboring cell or a signal quality difference between the neighboring cell and a source cell. A terminal may initiate a handover procedure in a case of a connection failure, thereby increasing a speed of connection recovery after the connection failure, increasing a success rate of connection establishment, reducing interruption of data transmission, and improving user experience.

20 Claims, 3 Drawing Sheets

(56) References Cited

U.S. PATENT DOCUMENTS

| | | | |
|---|---|---|---|
| 2007/0191013 A1* | 8/2007 | Gunnarsson | H04W 36/04 455/438 |
| 2010/0027507 A1 | 2/2010 | Li et al. | |
| 2010/0184438 A1* | 7/2010 | Wu | H04W 36/0058 455/436 |
| 2012/0099562 A1* | 4/2012 | Smadi | H04W 36/0085 370/332 |
| 2012/0163345 A1* | 6/2012 | Camarillo | H04W 36/023 370/332 |
| 2013/0178213 A1* | 7/2013 | Li | H04W 36/0085 455/436 |
| 2014/0126545 A1* | 5/2014 | Tamura | H04W 36/0069 370/332 |
| 2014/0128058 A1* | 5/2014 | Ji | H04W 24/04 455/423 |
| 2014/0179325 A1* | 6/2014 | Xu | H04W 36/08 455/437 |
| 2015/0264601 A1* | 9/2015 | Cha | H04W 36/0055 455/436 |
| 2016/0066222 A1* | 3/2016 | Makinen | H04W 74/006 370/331 |
| 2016/0219484 A1* | 7/2016 | Bontu | H04W 36/24 |
| 2017/0055197 A1* | 2/2017 | Shukair | H04W 36/30 |
| 2018/0176710 A1* | 6/2018 | Jang | H04W 88/10 |
| 2018/0279193 A1* | 9/2018 | Park | H04W 36/30 |
| 2019/0380081 A1* | 12/2019 | Chang | H04W 36/18 |
| 2019/0387438 A1* | 12/2019 | Chang | H04W 76/27 |
| 2019/0387440 A1* | 12/2019 | Yiu | H04W 36/00837 |
| 2020/0045602 A1 | 2/2020 | Jiang | |
| 2020/0396660 A1* | 12/2020 | Wu | H04W 76/30 |

FOREIGN PATENT DOCUMENTS

| | | |
|---|---|---|
| CN | 101635968 A | 1/2010 |
| CN | 103703800 A | 4/2014 |
| CN | 103906152 A | 7/2014 |
| CN | 104469865 A | 3/2015 |
| CN | 106792947 A | 5/2017 |
| CN | 107113673 A | 8/2017 |
| WO | 2011006424 A1 | 1/2011 |

OTHER PUBLICATIONS

Samsung, "Operational aspects of conditional handover mechanism"; 3rd Generation Partnership Project, 3GPP TSG-RAN2#101, R2-1802487: Feb. 26-Mar. 2, 2018; 4 pages.

International Search Report for International Application No. PCT/CN2019/096773; dated Sep. 27, 2019.

ASTRI, TCL Communication Ltd., "Discussion on Conditional Handover in NR", 3GPP TSG-RAN WG2 Meeting #101, R2-1802008; Feb. 26-Mar. 2, 2018; 6 pages.

EPO Extended European Search Report for EP Application No. 19849876.8; dated Mar. 18, 2022.

Ericsson, "Conditional Handover", 3GPP TSG-RAN WG2 #100, R2-1713606, Nov. 27-Dec. 1, 2017; 6 pages.

Ericsson, "On Reliability, overhead and controllability aspects of Conditional Handover", 3GPP TSG-RAN WG2 #101, R2-1803338; Feb. 26-Mar. 2, 2018; 6 pages.

* cited by examiner

CONDITIONAL HANDOVER METHOD AND APPARATUS

CROSS-REFERENCE TO RELATED APPLICATIONS

This is the U.S. national stage of application No. PCT/CN2019/096773, filed on Jul. 19, 2019. Priority under 35 U.S.C. § 119(a) and 35 U.S.C. § 365(b) is claimed from Chinese Application No. 201810945141.9, filed Aug. 17, 2018, the disclosure of which is also incorporated herein by reference.

TECHNICAL FIELD

The present disclosure generally relates to mobile communication field, and more particularly, to a conditional handover method and apparatus.

BACKGROUND

In a mobile communication system, if a terminal has any one of an integrity check failure, a Radio Resource Control (RRC) connection reconfiguration failure, a primary cell group synchronization failure, a handover failure and a radio link failure, an RRC re-establishment procedure is triggered for the terminal. During the RRC re-establishment procedure, it may fail as a target base station does not have context information of the terminal. In addition, the base station also performs access control on the terminal performing the RRC re-establishment procedure, and may refuse an access of the terminal, which further increases possibility of an RRC re-establishment failure.
201810945141.9, filed on Aug. 17, 2018, and entitled "CONDITIONAL HANDOVER METHOD AND APPARATUS", the entire disclosure of which is incorporated herein by reference.

TECHNICAL FIELD

The present disclosure generally relates to mobile communication field, and more particularly, to a conditional handover method and apparatus.

BACKGROUND

In a mobile communication system, if a terminal has any one of an integrity check failure, a Radio Resource Control (RRC) connection reconfiguration failure, a primary cell group synchronization failure, a handover failure and a radio link failure, an RRC re-establishment procedure is triggered for the terminal. During the RRC re-establishment procedure, it may fail as a target base station does not have context information of the terminal. In addition, the base station also performs access control on the terminal performing the RRC re-establishment procedure, and may refuse an access of the terminal, which further increases possibility of an RRC re-establishment failure.

Therefore, a mechanism is needed to enable the terminal to quickly recovery a connection after the above connection failure occurs.

SUMMARY

In an embodiment of the present disclosure, a conditional handover method is provided, including: receiving a measurement report and transmitting a handover preparation instruction to a neighboring base station; and transmitting a conditional handover command to a terminal, wherein the conditional handover command is configured to enable the terminal to perform a handover procedure in a target cell or an RRC re-establishment procedure in a case of a connection failure, wherein the conditional handover command includes a first signal condition, and the first signal condition includes signal quality of a neighboring cell or a signal quality difference between the neighboring cell and a source cell.

Optionally, the conditional handover command further includes a resource reservation condition, and the resource reservation condition includes at least one of a first timer and a second timer, wherein if the resource reservation condition includes the first timer, the resource reservation condition is that the first timer does not exceed a first preset time threshold; if the resource reservation condition only includes the second timer, the resource reservation condition is that the second timer does not exceed a second preset time threshold; or if the resource reservation condition includes the first timer and the second timer, the terminal uses one of the first and second timers, wherein the first timer includes a valid period for allowing the terminal to perform a conditional handover, and the second timer includes a valid period for a dedicated random access resource for the conditional handover.

Optionally, the first signal condition includes that the signal quality of the neighboring cell exceeds a first threshold, or the signal quality difference between the neighboring cell and the source cell is greater than a second threshold.

Optionally, the conditional handover command further includes a second signal condition, and the second signal condition includes that the signal quality of the neighboring cell exceeds a third threshold, or the signal quality difference between the neighboring cell and the source cell is greater than a fourth threshold, wherein the third threshold is less than the first threshold, and the fourth threshold is less than the second threshold.

Optionally, the conditional handover command further includes indication information for indicating whether the handover procedure can be initiated when the connection failure occurs, wherein if the indication information indicates that the handover procedure can be initiated, the handover procedure is performed, or if the indication information indicates that the handover procedure cannot be initiated, the RRC re-establishment procedure is performed.

Optionally, the target cell is a cell with the highest priority among a plurality of neighboring cells.

Optionally, for each of the plurality of neighboring cells, a priority of the cell is indicated by the conditional handover command, or determined based on a measurement result of the terminal on the cell.

In an embodiment of the present disclosure, a conditional handover method is provided, including: receiving a handover preparation instruction; performing handover preparation based on the handover preparation instruction; and receiving a handover request from a terminal, or performing an RRC re-establishment procedure for the terminal.

In an embodiment of the present disclosure, a conditional handover method is provided, including: transmitting a measurement report to a source base station; receiving a conditional handover command from the source base station; and when a connection failure occurs, performing a handover procedure in a target cell or an RRC re-establishment procedure, wherein the conditional handover command includes a first signal condition, and the first signal condition includes signal quality of a neighboring cell or a signal quality difference between the neighboring cell and a source cell.

Optionally, when the connection failure occurs, if the first signal condition is met, the handover procedure is performed in the target cell; or if the first signal condition is not met, the RRC re-establishment procedure is performed.

Optionally, the conditional handover command further includes a second signal condition, the second signal condition includes signal quality of the target cell or a signal quality difference between the source cell and the target cell, and a satisfaction standard of the second signal condition is lower than a satisfaction standard of the first signal condition, wherein when the connection failure occurs, if the second signal condition is met, the handover procedure is performed in the target cell; or if the second signal condition is not met, the RRC re-establishment procedure is performed.

Optionally, the conditional handover command further includes a resource reservation condition, and the resource reservation condition includes at least one of a first timer and a second timer, wherein if the resource reservation condition includes the first timer, the resource reservation condition is that the first timer does not exceed a first preset time threshold; if the resource reservation condition only includes the second timer, the resource reservation condition is that the second timer does not exceed a second preset time threshold; or if the resource reservation condition includes the first timer and the second timer, one of the first and second timers is used, wherein the first timer includes a valid period for allowing performing a conditional handover, and the second timer includes a valid period for a dedicated random access resource for the conditional handover.

Optionally, when the connection failure occurs, if the resource reservation condition is met, the handover procedure is performed in the target cell; if the resource reservation condition is not met, the RRC re-establishment procedure is performed.

Optionally, when the connection failure occurs, if the first signal condition and the resource reservation condition are met, the handover procedure is performed in the target cell; or if the first signal condition or the resource reservation condition is not met, the RRC re-establishment procedure is performed.

Optionally, the conditional handover command further includes a second signal condition, the second signal condition includes signal quality of the target cell or a signal quality difference between the source cell and the target cell, and a satisfaction standard of the second signal condition is lower than a satisfaction standard of the first signal condition, wherein when the connection failure occurs, if the second signal condition and the resource reservation condition are met, the handover procedure is performed in the target cell; or if the second signal condition or the resource reservation condition is not met, the RRC re-establishment procedure is performed.

Optionally, the connection failure includes a radio link failure.

Optionally, the first signal condition includes that the signal quality of the neighboring cell exceeds a first threshold, or the signal quality difference between the neighboring cell and the source cell is greater than a second threshold.

Optionally, the conditional handover command further includes indication information for indicating whether the handover procedure can be initiated when the connection failure occurs, wherein if the indication information indicates that the handover procedure can be initiated, the handover procedure is performed, or if the indication information indicates that the handover procedure cannot be initiated, the RRC re-establishment procedure is performed.

Optionally, the target cell is a cell with the highest priority among a plurality of neighboring cells, and for each of the plurality of neighboring cells, a priority of the cell is indicated by the conditional handover command, or determined based on a measurement result on the cell.

Optionally, performing the handover procedure in the target cell includes: selecting the one with the highest priority from the plurality of neighboring cells as the target cell to perform the handover procedure.

Optionally, performing the RRC re-establishment procedure includes: selecting the one with the highest priority from the plurality of neighboring cells as the target cell to perform the RRC re-establishment procedure.

In an embodiment of the present disclosure, a conditional handover apparatus on a source base station side including a memory and a processor, wherein the memory has computer instructions stored therein, and when the processor executes the computer instructions, the above conditional handover method on the source base station side is performed.

In an embodiment of the present disclosure, a conditional handover apparatus on a target base station side including a memory and a processor, wherein the memory has computer instructions stored therein, and when the processor executes the computer instructions, the above conditional handover method on the target base station side is performed.

In an embodiment of the present disclosure, a conditional handover apparatus on a terminal side including a memory and a processor, wherein the memory has computer instructions stored therein, and when the processor executes the computer instructions, the above conditional handover method on the terminal side is performed.

Embodiments of the present disclosure may provide following advantages.

In the embodiments of the present disclosure, a terminal may initiate a handover procedure in a case of a connection failure, thereby increasing a speed of connection recovery after the connection failure, increasing a success rate of connection establishment, reducing interruption of data transmission, and improving user experience.

Further, the terminal performs an RRC re-establishment procedure when the handover procedure cannot be triggered or fails, thereby avoiding a connection failure, improving robustness of a connection between the terminal and a base station, guaranteeing transmission of user data, and improving user experience.

DETAILED DESCRIPTION

The present disclosure may be applied to 5G (Fifth Generation) communication systems, 4G or 3G communication systems, or various subsequently evolutionary communication systems, such as 6G or 7G.

Figure 1:
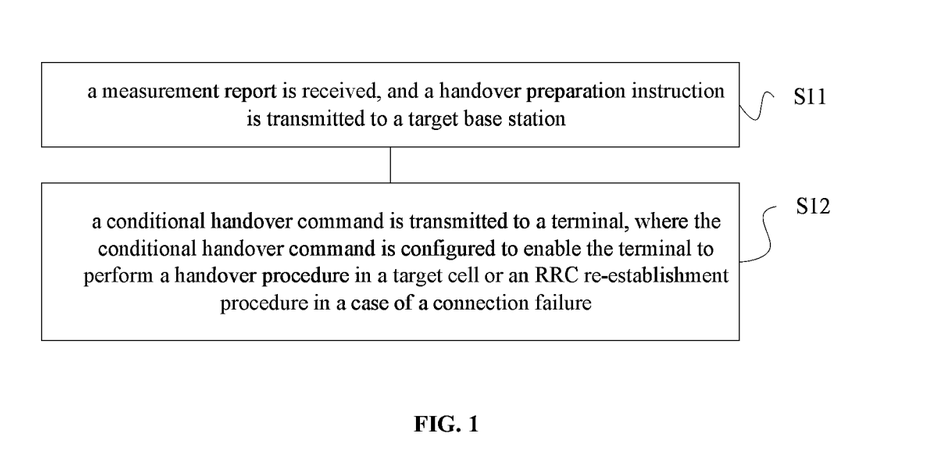
FIG. 1 is a flow chart of a conditional handover method on a source base station side according to an embodiment.

Referring to FIG. 1, FIG. 1 is a flow chart of a conditional handover method on a source base station side according to an embodiment.

In S11, a measurement report is received, and a handover preparation instruction is transmitted to a target base station.

In some embodiments, the source base station receives the measurement report from a terminal, and transmits a handover preparation instruction to a base station of each neighboring cell. The measurement report may include signal strength of each neighboring cell detected by the terminal, where the target cell is one neighboring cell. The measurement report may further include signal strength of a serving cell. The signal strength may be in the form of Reference Signal Receiving Power (RSRP), Reference Signal Receiving Quality (RSRQ), or Signal to Interference plus Noise Ratio (SINR).

In S12, a conditional handover command is transmitted to a terminal, where the conditional handover command is configured to enable the terminal to perform a handover procedure in a target cell or an RRC re-establishment procedure in a case of a connection failure.

In some embodiments, the conditional handover command may be carried in an RRC message, including but not limited to an RRC reconfiguration message.

In some embodiments, in the case of the connection failure, the terminal selects the target cell from a plurality of neighboring cells to perform the handover procedure or the RRC re-establishment procedure.

In some embodiments, the conditional handover command includes a first signal condition, where the first signal condition includes signal quality of a neighboring cell or a signal quality difference between the neighboring cell and a source cell.

In some embodiments, the conditional handover command further includes a resource reservation condition, and the resource reservation condition includes at least one of a first timer and a second timer.

In some embodiments, if the resource reservation condition includes the first timer, that is, the resource reservation condition only includes the first timer, or the resource reservation condition includes the first timer and the second timer, the resource reservation condition is that the first timer does not exceed a first preset time threshold, where the first preset time threshold is a valid period for allowing the terminal to perform a conditional handover.

If the resource reservation condition only includes the second timer, the resource reservation condition is that the second timer does not exceed a second preset time threshold, where the second preset time threshold is a valid period for a dedicated random access resource for the conditional handover. The first preset time threshold and the second preset time threshold may be configured by the base station.

If the resource reservation condition includes the first timer and the second timer, the terminal uses one of the first and second timers. One possible rule is that the base station instructs the terminal to use one of the first timer and the second timer through signaling, and another possible rule is that the terminal uses one of the first timer and the second timer which has a longer duration. In some embodiments, when the terminal receives the conditional handover command, the first timer and the second timer start timing.

With the above configuration, it is ensured that when the terminal performs a random access procedure (i.e., the handover procedure) to the target cell, there are random access resources in the target cell for the terminal to use, thereby improving a success rate of random access.

In some embodiments, the first signal condition includes that the signal quality of the neighboring cell exceeds a first threshold or the signal quality difference between the neighboring cell and the source cell is greater than a second threshold. The first threshold and the second threshold are set by the source base station. In some embodiments, if RSRP is adopted, a range of the first threshold may be −144 dBm to −44 dBm. In some embodiments, the range of the first threshold may be −144 dBm to 44 dBm. A range of the second threshold may be 0 dB to 100 dB.

In some embodiments, the conditional handover command further includes a second signal condition, and the second signal condition includes the signal quality of the neighboring cell exceeds a third threshold or the signal quality difference between the neighboring cell and the source cell is greater than a fourth threshold. The third threshold is less than the first threshold, and the fourth threshold is less than the second threshold. The third threshold and the fourth threshold may be set in absolute values respectively, or may be set in a form of offsets of the first threshold and the second threshold respectively.

By setting the second signal condition with lower requirements, it is possible to increase possibility of handover to the target cell when the terminal fails to connect to the source cell, thereby increasing a speed of connection recovery and a success rate of connection establishment, reducing interruption of data transmission, and improving user experience.

In some embodiments, the conditional handover command further includes indication information for indicating whether the terminal can initiate the handover procedure when the connection failure occurs. If the indication information indicates that the terminal can initiate the handover procedure, the handover procedure is performed, or if the indication information indicates that the terminal cannot initiate the handover procedure, the RRC re-establishment procedure is performed.

By setting the indication information in the conditional handover command, it is possible to decide whether to use the conditional handover method provided by the embodiments of the present disclosure according to different scenarios, so as to improve flexibility of systems.

The handover procedure means that the terminal uses a random access resource in the handover command to initiate random access in the target cell, so as to realize a handover from the source cell to the target cell.

In some embodiments, the target cell is a cell with the highest priority among a plurality of neighboring cells.

In some embodiments, for each of the plurality of neighboring cells, a priority of the cell may be indicated by the conditional handover command, or determined based on a measurement result of the terminal on the cell. The terminal may select one of the plurality of neighboring cells as the target cell for handover based on the priority of each cell, thereby improving handover performance.

In some embodiments, the priority may be indicated by the source base station through the conditional handover command. The priority may include the priority of the target cell and the priority of a frequency where the target cell is located. The priority of the target cell may be expressed by a numerical value, for example, 1, 2, 3, . . . , 32, where 1 represents the highest priority, and 32 represents the lowest priority. The priority of the frequency of the cell may also be represented by a numerical value, for example, 1, 2, 3, . . . , 32, where 1 represents the highest priority, and 32 represents the lowest priority.

In some embodiments, the priority of the cell may be determined based on the measurement result on the cell by the terminal. That is, the source base station does not need to indicate the priority of each neighboring cell through the conditional handover command, but determines the priority of each neighboring cell in a predetermined manner.

In some embodiments, the priority of each neighboring cell may be determined based on signal quality of the neighboring cell. For example, a neighboring cell with higher absolute signal quality has a higher priority, and a neighboring cell with lower absolute signal quality has a lower priority.

In some embodiments, the priority of each neighboring cell may be determined based on a difference between the signal quality of the neighboring cell and the first threshold. For example, the neighboring cell with the smallest difference between the signal quality and the first threshold has the highest priority, and the neighboring cell with the largest difference between the signal quality and the first threshold has the lowest priority.

In some embodiments, the priority of each neighboring cell may be determined based on the number of beams exceeding a certain signal quality threshold. For example, the neighboring cell with the largest number of beams exceeding the certain signal quality threshold has the highest priority, and the adjacent cell with the smallest number of beams exceeding the certain signal quality threshold has the lowest priority. The signal quality threshold may be a signal quality threshold corresponding to a handover trigger condition, or may be another signal quality threshold configured by the network, for example, a signal quality threshold defined by a certain measurement event. In some embodiments, if the number of beams exceeding the signal quality threshold in cell A is 2, and the number of beams exceeding the signal quality threshold in cell B is 3, the priority of cell B is higher than that of cell B.

In some embodiments, the priority of each neighboring cell may be determined based on a remaining duration of a timer corresponding to the neighboring cell, and the timer may be the first timer or the second timer. For example, among the neighboring cells, the neighboring cell with the longest remaining time of the corresponding timer has the highest priority, and the neighboring cell with the shortest remaining time of the corresponding timer has the lowest priority. Information about the first timer and the second timer has been described above, and is not repeated here.

Figure 2:
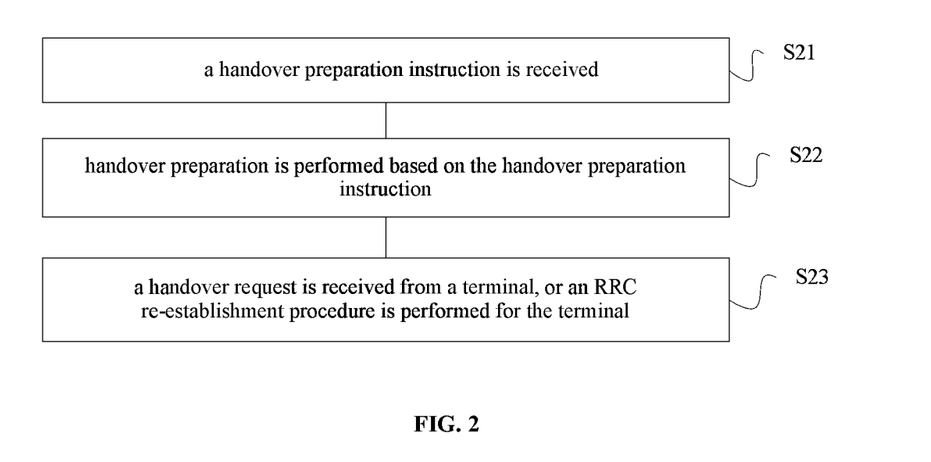
FIG. 2 is a flow chart of a conditional handover method on a target base station side according to an embodiment.

FIG. 2 is a flow chart of a conditional handover method on a target base station side according to an embodiment. The conditional handover method on the target base station side includes S21, S22 and S23.

In S21, a handover preparation instruction is received.

In some embodiments, each neighboring base station receives a handover preparation instruction from a source base station.

In S22, handover preparation is performed based on the handover preparation instruction.

It should be noted that the handover preparation of each neighboring base station includes preparation for resources required by the terminal for handover in the target base station, which may specifically include random access resources required by the terminal for a handover procedure in the target cell. After the handover preparation is completed, handover preparation acknowledgement information is transmitted to the source base station.

In S23, a handover request is received from a terminal, or an RRC re-establishment procedure is performed for the terminal.

In some embodiments, when a connection between the terminal and the source base station fails, a cell with the highest priority among neighboring cells (i.e, the target cell) receives the handover request from the terminal, or performs the RRC re-establishment procedure with the terminal.

Figure 3:
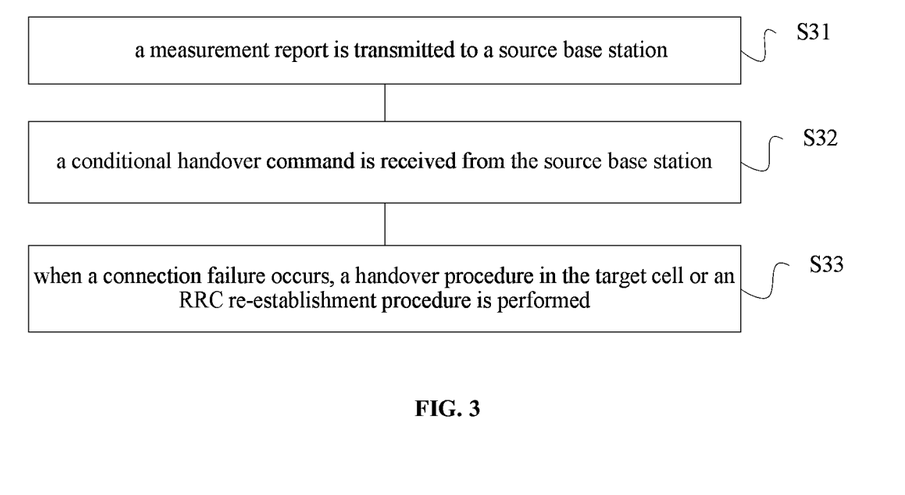
FIG. 3 is a flow chart of a conditional handover method on a terminal side according to an embodiment.

FIG. 3 is a flow chart of a conditional handover method on a terminal side according to an embodiment.

In S31, a measurement report is transmitted to a source base station.

Specifically, the measurement report may include signal strength of each neighboring cell detected by the terminal.

In S32, a conditional handover command is received from the source base station.

In some embodiments, the conditional handover command includes a first signal condition, and the first signal condition includes signal quality of a neighboring cell or a signal quality difference between the neighboring cell and a source cell. Before a connection failure, if the terminal meets the first signal condition, the terminal performs a handover procedure.

In S33, when a connection failure occurs, a handover procedure in the target cell or an RRC re-establishment procedure is performed.

In some embodiments, the conditional handover command includes the first signal condition, and when the connection failure occurs, the terminal performs the handover procedure in the target cell.

In some embodiments, the conditional handover command includes the first signal condition. When the connection failure occurs, if the first signal condition is met, the terminal performs the handover procedure in the target cell; if the first signal condition is not met, the terminal performs the RRC re-establishment procedure. The RRC re-establishment procedure includes that the terminal transmits an RRC Connection Reestablishment Request message to the base station, and the base station determines whether to reestablish an RRC connection with the terminal upon reception of the RRC Connection Reestablishment Request message.

In some embodiments, the conditional handover command further includes a second signal condition, the second signal condition includes signal quality of the target cell or a signal quality difference between the source cell and the target cell, and a satisfaction standard of the second signal condition is lower than a satisfaction standard of the first signal condition, In some embodiments, the conditional handover command includes the first signal condition and the second signal condition. When the connection failure between the terminal and the source base station occurs, if the second signal condition is met, the terminal performs the handover procedure in the target cell; or if the second signal condition is not met, the RRC re-establishment procedure is performed.

In some embodiments, the conditional handover command further includes a resource reservation condition, and the resource reservation condition includes at least one of a first timer and a second timer. If the resource reservation condition includes the first timer, the resource reservation condition is that the first timer does not exceed a first preset time threshold; if the resource reservation condition only includes the second timer, the resource reservation condition is that the second timer does not exceed a second preset time threshold; or if the resource reservation condition comprises the first timer and the second timer, one of the first and second timers is used by the terminal. The first timer includes a valid period for allowing performing a conditional handover, and the second timer includes a valid period for a dedicated random access resource for the conditional handover.

In some embodiments, if the resource reservation condition includes the first timer and the second timer, the base station may instruct the terminal to use one of the first timer and the second timer through signaling. Alternatively, one of the first timer and the second timer which has a longer duration may be used.

In some embodiments, the conditional handover command includes the first signal condition and the resource reservation condition. When the connection failure occurs, if the resource reservation condition is met, the terminal performs the handover procedure in the target cell; or if the resource reservation condition is not met, the RRC re-establishment procedure is performed.

In some embodiments, the conditional handover command includes the first signal condition and the resource reservation condition. When the connection failure occurs, if the first signal condition and the resource reservation condition are met, the terminal performs the handover procedure in the target cell; or if the first signal condition or the resource reservation condition is not met, the RRC re-establishment procedure is performed.

In some embodiments, the conditional handover command includes the first signal condition, the second signal condition and the resource reservation condition. When the connection failure occurs, if the second signal condition and the resource reservation condition are met, the terminal performs the handover procedure in the target cell; or if the second signal condition or the resource reservation condition is not met, the RRC re-establishment procedure is performed.

In the above six cases, if the terminal fails in the handover procedure in the target cell, the RRC re-establishment procedure is performed.

In some embodiments, the first signal condition includes that the signal quality of the neighboring cell exceeds a first threshold or the signal quality difference between the neighboring cell and the source cell is greater than a second threshold. The first threshold and the second threshold are set by the base station. In some embodiments, if RSRP is adopted, a range of the first threshold may be −144 dBm to −44 dBm. In some embodiments, the range of the first threshold may be −144 dBm to 44 dBm. A range of the second threshold may be 0 dB to 100 dB.

In some embodiments, the second signal condition includes the signal quality of the neighboring cell exceeds a third threshold or the signal quality difference between the neighboring cell and the source cell is greater than a fourth threshold. The third threshold is less than the first threshold, and the fourth threshold is less than the second threshold. The third threshold and the fourth threshold may be set in absolute values respectively, or may be set in a form of offsets of the first threshold and the second threshold respectively.

In some embodiments, the connection failure merely includes a radio link failure. In some embodiments, the connection failure may be any connection failure, including but not limited to an integrity check failure, an RRC connection reconfiguration failure, a primary cell group synchronization reconfiguration failure and a radio link failure.

In some embodiments, the conditional handover command further includes indication information for indicating whether the terminal can initiate the handover procedure when the connection failure occurs. If the indication information indicates that the terminal can initiate the handover procedure, the handover procedure is performed, or if the indication information indicates that the terminal cannot initiate the handover procedure, the RRC re-establishment procedure is performed.

Therefore, if the indication information indicates that the terminal can initiate the handover procedure, when the terminal fails to connect with the source cell, the solution proposed in the embodiment of the present disclosure is adopted to decide whether to perform the handover procedure. If the indication information indicates that the terminal cannot initiate the handover procedure, when the connection between the terminal and the source cell fails, the terminal directly performs the RRC re-establishment procedure.

In some embodiments, the target cell is a cell with the highest priority among a plurality of neighboring cells, and the priority is indicated by the conditional handover command, or determined based on a measurement result on the cell.

In some embodiments, performing the handover procedure in the target cell includes: selecting the one with the highest priority from the plurality of neighboring cells as the target cell to perform the handover procedure.

In some embodiments, performing the RRC re-establishment procedure includes: selecting the one with the highest priority from the plurality of neighboring cells as the target cell to perform the RRC re-establishment procedure. That is, the priority of each neighboring cell is also considered in the RRC re-establishment procedure.

In some embodiments, for each of the plurality of neighboring cells, the priority of the cell is indicated by the conditional handover command, or determined based on a measurement result of the terminal on the cell.

In some embodiments, the priority may be indicated by the source base station through the conditional handover command, including a priority of the target cell and a priority of a frequency where the target cell is located. Therefore, the terminal may select the neighbor cell with the highest priority as the target cell for the handover procedure based on the priority of the target cell and the priority of the frequency where the target cell is located.

In some embodiments, the priority may be determined based on the measurement result of the terminal on the cell. That is to say, the source base station does not need to indicate the priority of each neighboring cell through the conditional handover command, but determines the priority of each neighboring cell through a predetermined manner. Specifically, the terminal may determine the priority of each neighboring cell based on the signal quality of the neighboring cell, the difference between the signal quality of the neighboring cell and the first threshold, the number of beams exceeding the certain signal quality threshold, or a remaining time of the timer corresponding to the neighboring cell.

Figure 4:
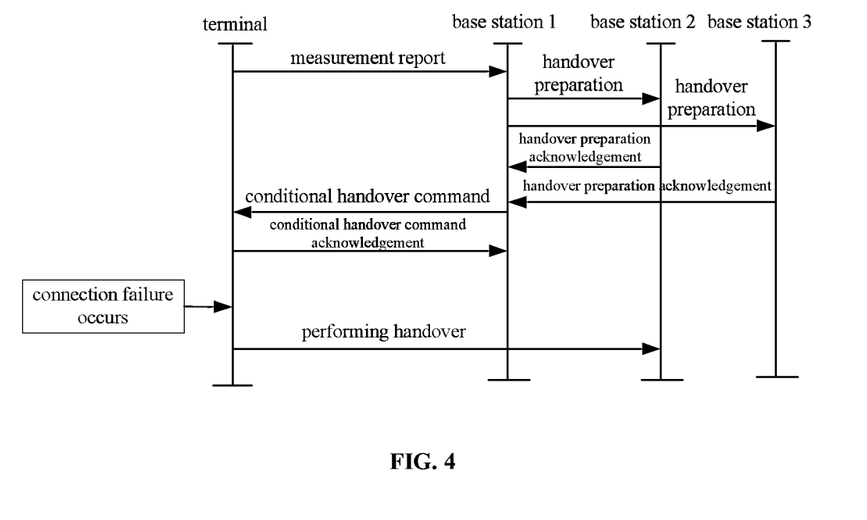
FIG. 4 is a signaling interaction diagram of a conditional handover method according to an embodiment.

Referring to FIG. 4, FIG. 4 is a signaling interaction diagram of a conditional handover method according to an embodiment.

In the embodiment as shown in FIG. 4, base station 1 is a source base station, and base station 2 and base station 3 are neighboring base stations. The terminal transmits a measurement report to base station 1, and base station 1 transmits a handover preparation instruction to base station 2 and base station 3, and receives handover preparation acknowledgement information from base station 2 and base station 3. After completing the handover preparation, base station 1 transmits a conditional handover instruction to the terminal. The handover preparation instruction includes a first signal condition, a resource reservation condition and a second signal condition. After the terminal fails in connection, if both the base station 2 and the base station 3 meet the resource reservation condition and the second signal condition, the terminal may select the base station 2 with higher priority for handover based on priority information.

Figure 5:
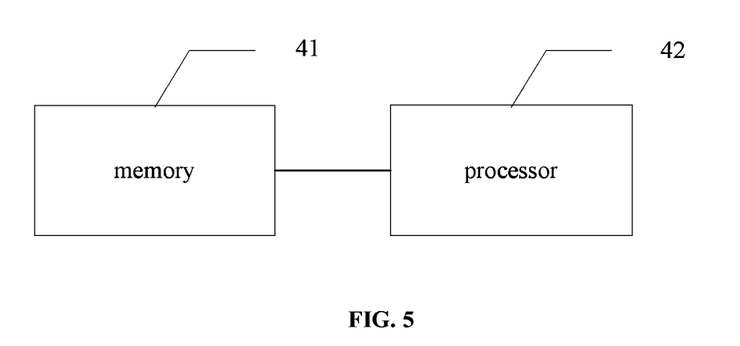
FIG. 5 is a structural diagram of a conditional handover apparatus on a source base station side according to an embodiment.

Referring to FIG. 5, FIG. 5 is a structural diagram of a conditional handover apparatus on a source base station side according to an embodiment. The apparatus includes a memory 41 and a processor 42. The memory 41 stores computer instructions that can run on the processor 42. The computer instructions stored on the memory 41 are instructions that implement steps of the above conditional handover apparatus on the source base station side. The processor 42 implements the steps when executing the computer instructions. The memory 41 may include a Read Only Memory (ROM), a Random Access Memory (RAM), a magnetic disk or an optical disk. The steps can be referred to the above descriptions, and are not described in detail here.

Figure 6:
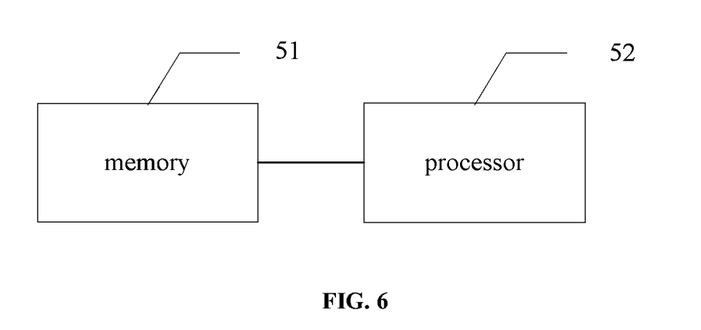
FIG. 6 is a structural diagram of a conditional handover apparatus on a target base station side according to an embodiment.

FIG. 6 is a structural diagram of a conditional handover apparatus on a target base station side according to an embodiment. The apparatus includes a memory 51 and a processor 52. The memory 51 stores computer instructions that can run on the processor 52. The computer instructions stored on the memory 51 are instructions that implement steps of the above conditional handover apparatus on the target base station side. The processor 52 implements the steps when executing the computer instructions. The memory 51 may include a ROM, a RAM, a magnetic disk or an optical disk. The steps can be referred to the above descriptions, and are not described in detail here.

Figure 7:
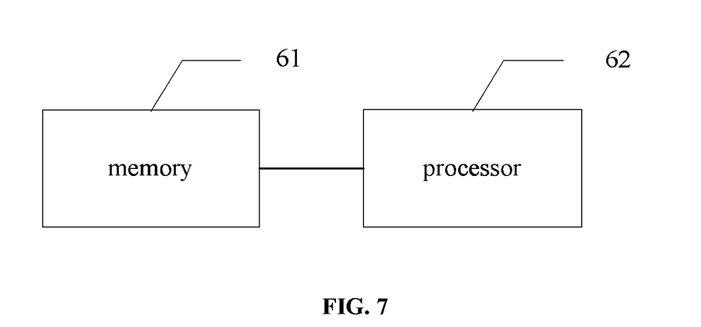
FIG. 7 is a structural diagram of a conditional handover apparatus on a terminal side according to an embodiment.

FIG. 7 is a structural diagram of a conditional handover apparatus on a terminal side according to an embodiment. The apparatus includes a memory 61 and a processor 62. The memory 61 stores computer instructions that can run on the processor 62. The computer instructions stored on the memory 61 are instructions that implement steps of the above conditional handover apparatus on the terminal side. The processor 62 implements the steps when executing the computer instructions. The memory 61 may include a ROM, a RAM, a magnetic disk or an optical disk. The steps can be referred to the above descriptions, and are not described in detail here.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A conditional handover method, comprising:
   receiving a measurement report and transmitting a handover preparation instruction to a neighboring base station; and
   transmitting a conditional handover command to a terminal, wherein the conditional handover command is configured to enable the terminal to perform a handover procedure in a target cell in a case of a connection failure or to perform a Radio Resource Control (RRC) re-establishment procedure in a case of the connection failure,
   wherein the conditional handover command comprises a first signal condition, and the first signal condition comprises signal quality of a neighboring cell or a signal quality difference between the neighboring cell and a source cell.

2. The method according to claim 1, wherein the conditional handover command further comprises a resource reservation condition, and the resource reservation condition comprises at least one of a first timer and a second timer, wherein if the resource reservation condition comprises the first timer, the resource reservation condition is that the first timer does not exceed a first preset time threshold; if the resource reservation condition only comprises the second timer, the resource reservation condition is that the second timer does not exceed a second preset time threshold; or if the resource reservation condition comprises the first timer and the second timer, the terminal uses one of the first and second timers,
   wherein the first timer comprises a valid period for allowing the terminal to perform a conditional handover, and the second timer comprises a valid period for a dedicated random access resource for the conditional handover.

3. The method according to claim 1, wherein the first signal condition comprises that the signal quality of the neighboring cell exceeds a first threshold, or the signal quality difference between the neighboring cell and the source cell is greater than a second threshold.

4. The method according to claim 1, wherein the conditional handover command further comprises indication information for indicating whether the handover procedure can be initiated when the connection failure occurs,
   wherein if the indication information indicates that the handover procedure can be initiated, the handover procedure is performed, or if the indication information indicates that the handover procedure cannot be initiated, the RRC re-establishment procedure is performed.

5. The method according to claim 1, wherein the target cell is a cell with the highest priority among a plurality of neighboring cells, and for each of the plurality of neighboring cells, a priority of the cell is indicated by the conditional handover command, or determined based on a measurement result of the terminal on the cell.

6. A conditional handover apparatus comprising a memory and a processor, wherein the memory has computer instructions stored therein, and when the processor executes the computer instructions, the conditional handover method of claim 1 is performed.

7. A conditional handover method, comprising:
   receiving a handover preparation instruction;
   performing handover preparation based on the handover preparation instruction; and
   receiving a handover request from a terminal, or performing a Radio Resource Control (RRC) re-establishment procedure for the terminal,
   wherein the handover request is sent or the RRC re-establishment procedure is performed when a connection failure occurs at the terminal.

8. A conditional handover apparatus comprising a memory and a processor, wherein the memory has computer instructions stored therein, and when the processor executes the computer instructions, the conditional handover method of claim 7 is performed.

9. A conditional handover method, comprising:
   transmitting a measurement report to a source base station;

receiving a conditional handover command from the source base station; and when a connection failure occurs, performing a handover procedure in a target cell or a Radio Resource Control (RRC) re-establishment procedure, wherein the conditional handover command comprises a first signal condition, and the first signal condition comprises signal quality of a neighboring cell or a signal quality difference between the neighboring cell and a source cell.

10. The method according to claim 9, wherein when the connection failure occurs, if the first signal condition is met, the handover procedure is performed in the target cell; or if the first signal condition is not met, the RRC re-establishment procedure is performed.

11. The method according to claim 9, wherein the conditional handover command further comprises a second signal condition, the second signal condition comprises signal quality of the target cell or a signal quality difference between the source cell and the target cell, and a satisfaction standard of the second signal condition is lower than a satisfaction standard of the first signal condition, wherein when the connection failure occurs, if the second signal condition is met, the handover procedure is performed in the target cell; or if the second signal condition is not met, the RRC re-establishment procedure is performed.

12. The method according to claim 9, wherein the conditional handover command further comprises a resource reservation condition, and the resource reservation condition comprises at least one of a first timer and a second timer, wherein if the resource reservation condition comprises the first timer, the resource reservation condition is that the first timer does not exceed a first preset time threshold; if the resource reservation condition only comprises the second timer, the resource reservation condition is that the second timer does not exceed a second preset time threshold; or if the resource reservation condition comprises the first timer and the second timer, one of the first and second timers is used, wherein the first timer comprises a valid period for allowing performing a conditional handover, and the second timer comprises a valid period for a dedicated random access resource for the conditional handover.

13. The method according to claim 12, wherein when the connection failure occurs, if the resource reservation condition is met, the handover procedure is performed in the target cell; if the resource reservation condition is not met, the RRC re-establishment procedure is performed.

14. The method according to claim 12, wherein when the connection failure occurs, if the first signal condition and the resource reservation condition are met, the handover procedure is performed in the target cell; or if the first signal condition or the resource reservation condition is not met, the RRC re-establishment procedure is performed.

15. The method according to claim 12, wherein the conditional handover command further comprises a second signal condition, the second signal condition comprises signal quality of the target cell or a signal quality difference between the source cell and the target cell, and a satisfaction standard of the second signal condition is lower than a satisfaction standard of the first signal condition, wherein when the connection failure occurs, if the second signal condition and the resource reservation condition are met, the handover procedure is performed in the target cell; or if the second signal condition or the resource reservation condition is not met, the RRC re-establishment procedure is performed.

16. The method according to claim 9, wherein the first signal condition comprises that the signal quality of the neighboring cell exceeds a first threshold, or the signal quality difference between the neighboring cell and the source cell is greater than a second threshold.

17. The method according to claim 9, wherein the conditional handover command further comprises indication information for indicating whether the handover procedure can be initiated when the connection failure occurs, wherein if the indication information indicates that the handover procedure can be initiated, the handover procedure is performed, or if the indication information indicates that the handover procedure cannot be initiated, the RRC re-establishment procedure is performed.

18. The method according to claim 9, wherein the target cell is a cell with the highest priority among a plurality of neighboring cells, and for each of the plurality of neighboring cells, a priority of the cell is indicated by the conditional handover command, or determined based on a measurement result on the cell.

19. The method according to claim 18, wherein performing the handover procedure in the target cell comprises:

selecting the one with the highest priority from the plurality of neighboring cells as the target cell to perform the handover procedure.

20. A conditional handover apparatus comprising a memory and a processor, wherein the memory has computer instructions stored therein, and when the processor executes the computer instructions, the conditional handover method of claim 9 is performed.

* * * * *